(12) United States Patent
Cross

(10) Patent No.: US 8,695,583 B2
(45) Date of Patent: *Apr. 15, 2014

(54) CHARCOAL GRILL WEATHER COVER

(76) Inventor: Del Cross, Seattle, WA (US)

( * ) Notice: Subject to any disclaimer, the term of this patent is extended or adjusted under 35 U.S.C. 154(b) by 256 days.

This patent is subject to a terminal disclaimer.

(21) Appl. No.: 13/076,131

(22) Filed: Mar. 30, 2011

(65) Prior Publication Data

US 2012/0247447 A1 Oct. 4, 2012

(51) Int. Cl.
*A47J 37/07* (2006.01)
*A47J 36/36* (2006.01)
*F24B 3/00* (2006.01)

(52) U.S. Cl.
USPC ........ 126/214 D; 126/25 R; 126/29; 126/211; 99/359; 135/96; 219/386

(58) Field of Classification Search
CPC .......... A47J 37/0786; A47J 37/07; F24B 1/02
USPC ............. 126/25 R, 214 D, 211, 220, 29, 276; 99/359; 219/386
See application file for complete search history.

(56) References Cited

U.S. PATENT DOCUMENTS

| | | | | |
|---|---|---|---|---|
| 367,170 A | * | 7/1887 | Warnecke | 126/25 R |
| 1,328,071 A | * | 1/1920 | Baldwin | 126/276 |
| 1,513,357 A | * | 10/1924 | Webber | 126/268 |
| 1,550,638 A | * | 8/1925 | Taylor | 126/276 |
| 2,862,758 A | * | 12/1958 | Robertson | 296/168 |
| 3,397,881 A | * | 8/1968 | Hedgecock | 472/14 |
| 4,014,315 A | * | 3/1977 | Lagunilla | 126/275 R |
| 4,061,127 A | * | 12/1977 | Fisher | 126/515 |
| 4,210,072 A | * | 7/1980 | Pedrini | 99/340 |
| 4,877,011 A | * | 10/1989 | Willice | 126/25 R |
| 5,950,617 A | * | 9/1999 | Lorenz | 126/276 |
| 5,967,134 A | * | 10/1999 | Harris | 126/41 R |
| 6,104,004 A | * | 8/2000 | Ragland et al. | 219/405 |
| 6,199,549 B1 | * | 3/2001 | Yerkes | 126/276 |
| 6,506,471 B2 | * | 1/2003 | Doppelt | 428/102 |
| 6,561,178 B1 | | 5/2003 | Hayes | |
| 6,598,514 B2 | * | 7/2003 | Leggi | 99/339 |
| 6,606,986 B2 | * | 8/2003 | Holland et al. | 126/25 R |
| 7,107,983 B1 | * | 9/2006 | West | 126/25 R |
| 7,240,683 B2 | | 7/2007 | Zutich | |
| 7,354,120 B2 | * | 4/2008 | DeMars | 312/140.2 |
| 7,644,711 B2 | * | 1/2010 | Creel | 126/80 |
| 8,316,836 B2 | * | 11/2012 | Grasso et al. | 126/25 R |

(Continued)

OTHER PUBLICATIONS

U.S. Appl. No. 13/065,862, filed Mar. 30, 2011, entitled "Gas Barbeque Grill Weather Cover."

*Primary Examiner* — Kang Hu
*Assistant Examiner* — Daniel E Namay
(74) *Attorney, Agent, or Firm* — Lowe Graham Jones PLLC

(57) ABSTRACT

Charcoal grill weather cover systems are operable to shelter a charcoal grill from rainfall. An exemplary embodiment has a charcoal grill weather cover portion configured to be disposed above a charcoal grill cover portion. The charcoal grill weather cover portion includes an exhaust portion and at least one support member. The support member includes at least a first end configured to be secured to the charcoal grill weather cover portion and a second end configured to be secured to the charcoal grill cover portion. The charcoal grill weather cover portion is configured to substantially prevent rainfall becoming incident on an outer surface of the charcoal grill cover portion while facilitating exhaust of combustion gasses out from the charcoal grill weather cover portion.

13 Claims, 4 Drawing Sheets

(56) References Cited

U.S. PATENT DOCUMENTS

| | | | |
|---|---|---|---|
| 8,353,279 B2 * | 1/2013 | Jackovitch | 126/25 R |
| 8,353,280 B2 * | 1/2013 | Jackovitch | 126/25 R |
| 2002/0076521 A1 * | 6/2002 | Doppelt | 428/102 |
| 2002/0179081 A1 * | 12/2002 | Holland et al. | 126/25 R |
| 2003/0084895 A1 | 5/2003 | Hayes | |
| 2005/0022801 A1 | 2/2005 | Wu | |
| 2005/0133076 A1 | 6/2005 | Zutich | |
| 2005/0155596 A1 * | 7/2005 | Andrews et al. | 126/25 R |
| 2006/0054157 A1 * | 3/2006 | Wang et al. | 126/25 R |
| 2006/0278210 A1 * | 12/2006 | Wang | 126/25 R |
| 2008/0041359 A1 * | 2/2008 | Kim | 126/25 R |
| 2009/0199838 A1 * | 8/2009 | Tsung | 126/214 D |
| 2009/0223547 A1 | 9/2009 | Schneider | |
| 2009/0308373 A1 * | 12/2009 | Scott et al. | 126/25 R |
| 2011/0083659 A1 * | 4/2011 | Grasso et al. | 126/25 R |
| 2012/0247446 A1 * | 10/2012 | Cross | 126/25 R |
| 2012/0247447 A1 * | 10/2012 | Cross | 126/25 R |
| 2013/0008427 A1 * | 1/2013 | Ahmed | 126/25 R |

* cited by examiner

CHARCOAL GRILL WEATHER COVER

BACKGROUND

FIG. 1 illustrates an exemplary prior art charcoal grill 102. The exemplary charcoal grill 102 is illustrated as comprising a base portion 104, a cover portion 106, a support portion 108, and an optional ash bin 110. A first handle 112 is affixed on the top of the cover portion 106 to facilitate removal of the cover portion 106 so that a user can access cooking food that resides in the base portion 104 of the charcoal grill 102. An optional second handle 114 is affixed to the base portion 104 to facilitate relocation of the charcoal grill 102. Handles 112, 114 may be affixed in alternative locations on the charcoal grill 102, and/or other handles (not shown) may be used. An optional thermometer 116 disposed on the exterior of the cover portion 106 may be included to indicate the cooking temperature within the cooking chamber of the charcoal grill 102.

Because a continuous flow of oxygen is necessary to maintain the charring of the charcoal briquettes during the cooking process, a ventilation port 118 is disposed on the cover portion 106. The ventilation port 118 may include one or more adjustable ventilation ports to control oxygen flow through the charcoal grill 102.

In inclement weather situations, such as when rainfall 120 is present, maintaining the internal temperate of the charcoal grill 102 may become difficult due to the evaporative cooling effect of the rainfall 120 falling on the surface of the cover portion 106 of the charcoal grill 102. That is, as the rainfall 120 lands on the cover portion 106, formed steam 122 results in an evaporative cooling effect, thereby reducing the internal cooking temperature of the charcoal grill 102.

If a shelter, such as an overhanging porch, canopy, tree or the like is available, the charcoal grill 102 may be moved to a location away from the rainfall 120. However, such shelters are not always available and/or conveniently accessible.

U.S. Pat. No. 6,561,178 discloses an umbrella assembly that attaches to the base portion 104 of the charcoal grill 102. However, the umbrella assembly may not be adequately sturdy for extreme inclement weather conditions, such as strong winds. Further, the rainfall 120 may still be able to fall on the cover portion 106 when a strong wind blows the rainfall 120 at an angle towards the charcoal grill 102. Also, the umbrella assembly is relatively difficult to remove from the base portion 104 of the charcoal grill 102 in the event that the charcoal grill 102 is moved any significant distance, such as when the user transports their charcoal grill 102 from their backyard to a picnic or a campground. And, the fabric used to construct the umbrella may not be heat resistant, and may therefore be subject to heat damage.

Accordingly, there is a need in the arts for improved protection from rainfall and other ambient conditions that may adversely impact the internal cooking temperature of the charcoal grill 102.

SUMMARY

Charcoal grill weather cover systems are operable to shelter a charcoal grill from rainfall. An exemplary embodiment has a charcoal grill weather cover portion configured to be disposed above a charcoal grill cover portion. The charcoal grill weather cover portion includes an exhaust portion and at least one support member. The support member includes at least a first end configured to be secured to the charcoal grill weather cover portion and a second end configured to be secured to the charcoal grill cover portion. The charcoal grill weather cover portion is configured to substantially prevent rainfall becoming incident on an outer surface of the charcoal grill cover portion while facilitating exhaust of combustion gasses out from the charcoal grill weather cover portion.

BRIEF DESCRIPTION OF THE DRAWINGS

Preferred and alternative embodiments are described in detail below with reference to the following drawings.

DETAILED DESCRIPTION

Figure 2:
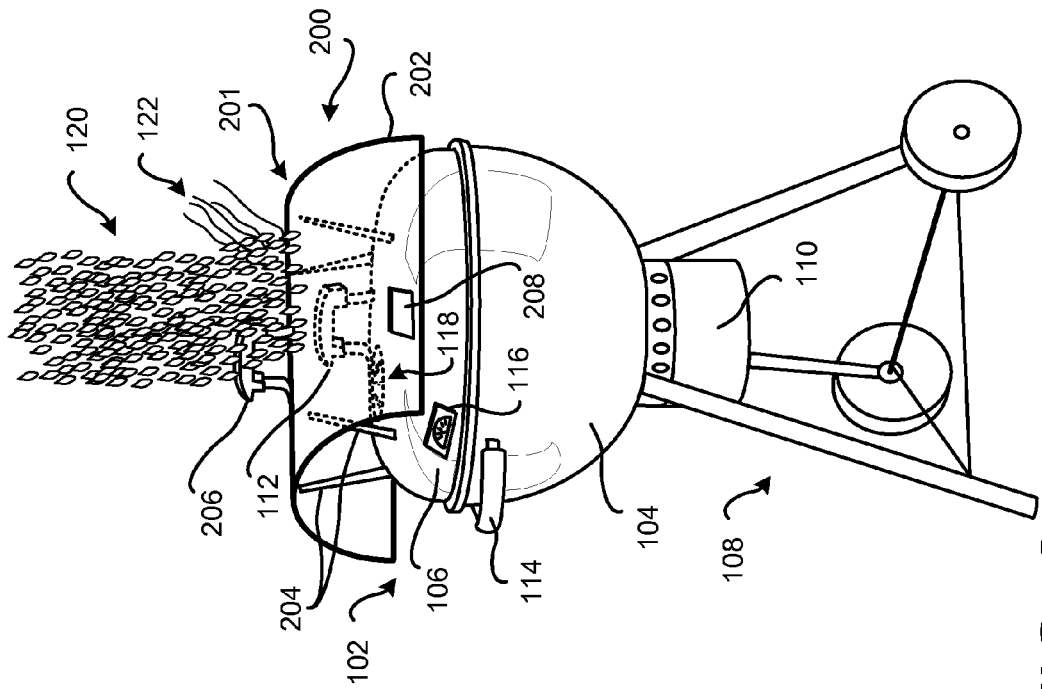
FIG. 2 is a perspective diagram of an embodiment of a charcoal grill weather cover affixed to a charcoal grill.
Figure 1:
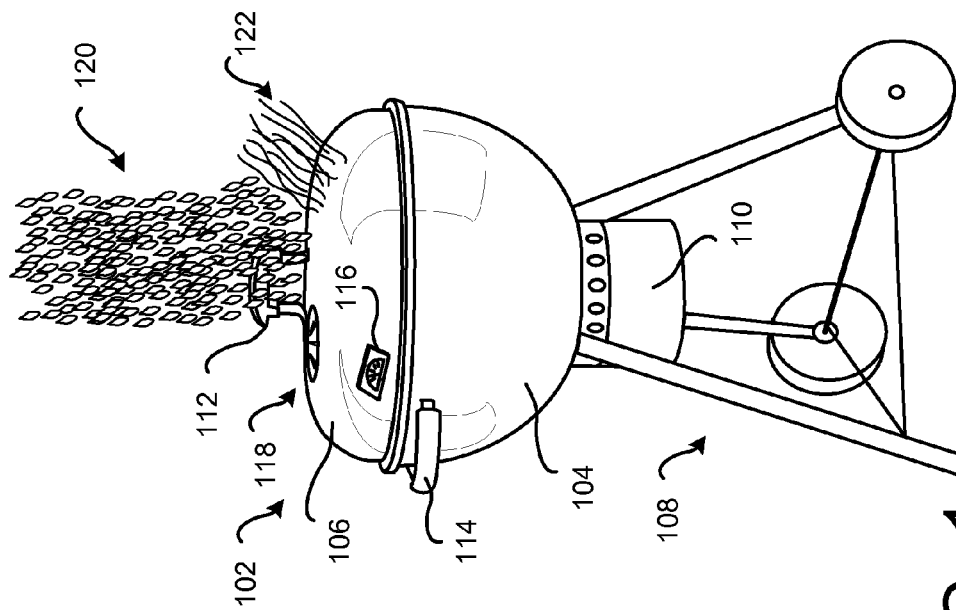
FIG. 1 illustrates an exemplary prior art charcoal grill with an exhaust portion.

FIG. 2 is a block diagram of an embodiment of a charcoal grill weather cover 200 with an exhaust portion 201. The charcoal grill weather cover 200 is affixed to a cover portion 106 of the charcoal grill 102. An exemplary embodiment of the charcoal grill weather cover 200 comprises the exhaust portion 201, a weather cover portion 202, four support members 204, and an optional handle 206. The exhaust portion 201 facilitates the exhaust of combustion gasses out from the charcoal grill weather cover 200.

The charcoal grill weather cover 200 is configured to prevent rainfall 120 or other precipitation from becoming incident onto the cover portion 106 of the charcoal grill 102, thereby helping to maintain the internal temperate of the charcoal grill 102. That is, the prevention of incident precipitation on the cover portion 106 of the charcoal grill 102 reduces or eliminates the evaporative cooling effect of the rainfall 120 otherwise falling on the surface of the cover portion 106 of the charcoal grill 102.

The exemplary charcoal grill weather cover 200 is affixed to a kettle-type charcoal grill 102. Embodiments of the charcoal grill weather cover 200 may be configured for, and affixed to, other shaped types of charcoal grills.

Preferably, the weather cover portion 202 is fabricated from a suitable metal. Other materials may be used, such as a plastic or a heat resistant fabric.

The support members 204 affix the weather cover portion 202 at a fixed distance above the cover portion 106 of the charcoal grill 102. Preferably, the distance above the cover portion 106 of the charcoal grill 102 is several inches, although any distance may be used so long as the exhaust portion 201 is able to facilitate the exhaust of combustion gasses out from the charcoal grill weather cover 200. Alternative embodiments may use fewer numbers of, or may use greater numbers of, the support members 204.

Once the charcoal grill weather cover 200 is affixed to the cover portion 106 of the charcoal grill 102, the charcoal grill weather cover 200 and the cover portion 106 of the charcoal grill 102 become a substantially rigid cover unit. Accordingly, the user may use the handle 206 on the top of the weather cover portion 202 to open up the top of the charcoal grill 102 for access to cooking foods within the cooking chamber of the charcoal grill 102. Further, in the event that the user wishes to transport their charcoal grill 102, such as from their backyard to a picnic or a campground, the cover unit may be easily removed from the base portion 104 of the charcoal grill 102 for convenient transportation.

The exemplary weather cover portion 202 is illustrated as a cylindrical portion that substantially encompasses at least the cover portion 106 of the charcoal grill 102. The weather cover portion 202 extends lengthwise from a first edge to a second edge of the cover portion 106 of the charcoal grill 102. In some embodiments, the length and/or width of the cylindrical shaped weather cover portion 202 may be greater than the extent of the cover portion 106 of the charcoal grill 102 so as to provide increased sheltering from the rainfall 120. In alternative embodiments, the length or width of the cylindrical shaped weather cover portion 202 may extend beyond only one edge, or even all edges, of the cover portion 106 of the charcoal grill 102.

Other covering shapes may be used for the weather cover portion 202, such as arcs, rectangles, flat sheets, curved sheets, or combinations thereof.

The cylindrical shaped weather cover portion 202 is configured to permit user access to the cover portion 106 and/or the handle 112 of the charcoal grill 102. The support members 204 are sufficiently long so that the user, in an exemplary embodiment, has safe and convenient access to the ventilation port 118. Accordingly, the weather cover portion 202 permits user access to adjust the air flow control means, if present, of the ventilation port 118.

Further, the exhaust portion 201 of the cylindrical shaped weather cover portion 202 facilitates air flow from the ventilation port 118 to the outside environment. That is, the shape and/or location of the exhaust portion 201 of the cylindrical shaped weather cover portion 202 permits the exhaust gasses to freely exit the ventilation port 118 and flow out from under the weather cover portion 202. It is appreciated that it is undesirable to impede the flow of air through the cooking chamber of the charcoal grill 102 since a steady supply of oxygen is required to maintain combustion of the charcoal briquettes or other charcoal material. If the exhaust gasses were trapped between the charcoal grill weather cover 200 and the cover portion 106 of the charcoal grill 102, the flow of oxygen to the charcoal briquettes would be impeded with an undesirable effect.

Depending upon the location of the optional thermometer 116 on the cover portion 106 of the charcoal grill 102, the cylindrical shaped weather cover portion 202 permits convenient viewing access to the optional thermometer 116. In the event that the user's view of the thermometer 116 is blocked, or partially blocked, a viewport 208 may be provided on the weather cover portion 202 to provide viewing access to the thermometer 116. The viewport 208 may optionally include a transparent cover.

Any suitable exhaust portion 201 on the charcoal grill weather cover 200 may be used by the various embodiments. For example, a slight tilt of the angle of the charcoal grill weather cover 200 may define the higher portion of the charcoal grill weather cover 200 as the exhaust portion 201. Alternatively, or additionally, a channel or the like may be fabricated into the charcoal grill weather cover 200 to guide the flow of the exhaust of combustion gasses out from the charcoal grill weather cover 200. Alternatively, or additionally, one or more perforations, apertures, holes, vents, or the like, may be disposed in the charcoal grill weather cover 200 to define all of, or part of, the exhaust portion 201.

Figure 3:
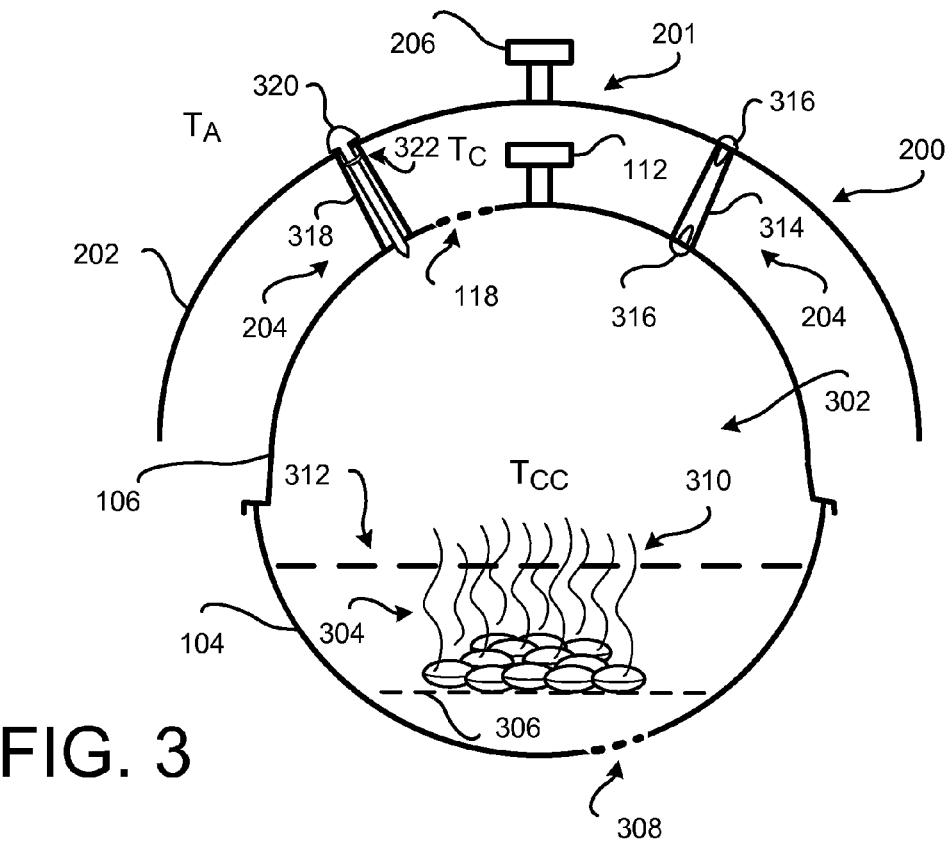
FIG. 3 is a cross sectional view of the charcoal grill and the charcoal grill weather cover embodiment of FIG. 2.

FIG. 3 is a cross sectional view of the charcoal grill 102 and the charcoal grill weather cover 200 of FIG. 2. The base portion 104 and the cover portion 106 of the charcoal grill 102 cooperatively define a cooking chamber 302. Since the relatively hot exhaust gasses rise, the upper most region of the charcoal grill weather cover 200 defines the exhaust portion 201. Since the exemplary embodiment of the charcoal grill weather cover 200 is generally cylindrical, the exhaust portion 201 facilitates exhaust of combustion gasses out from the charcoal grill weather cover 200.

When in use, a plurality of charcoal briquettes 304 rest on the top of a briquette grate 306 which holds the charcoal briquettes 304 above the bottom surface of the base portion 104 so as to facilitate free flow of oxygen-rich air about the charcoal briquettes 304. An air intake port 308 may be disposed on the bottom of the base portion 104 to provide a supply of the fresh air. As the heated air 310 rises, fresh air is drawn through the air intake port 308 to refresh the oxygen supply that is necessary to maintain combustion of the charcoal briquettes 304.

The heated rising air 310, in addition to radiant heat emitted by the combusting charcoal briquettes 304, heats the temperature of cooking chamber ($T_{CC}$). Food items placed on the grill 312 will cook when the temperature of cooking chamber ($T_{CC}$) is at a suitable cooking temperature. When rain falls upon embodiments of the weather cover portion 202, evaporative cooling does not as quickly affect the temperature of cooking chamber ($T_{CC}$). The cool rainfall, and/or any evaporative cooling effects, will reduce the cover temperature ($T_C$) of the weather cover portion 202. Since air is itself a reasonable insulator, the air between the charcoal grill weather cover 200 and the cover portion 106 of the charcoal grill 102 will reduce the rate of the decrease in the temperature of cooking chamber ($T_{CC}$). Further, if the ambient temperature (TA) itself is relatively cold, the relatively warmer air between the charcoal grill weather cover 200 and the cover portion 106 of the charcoal grill 102 will help maintain temperature and/or reduce the rate of the decrease in the temperature of the cooking chamber ($T_{CC}$).

In an exemplary embodiment, the plurality of support members 204 are post-like structures that comprise a tubular portion 314 with optional internal threading that is configured to receive a mating screw 316. The mating screws 316 affix the threaded receiving ends of the tubular portion 314 to the weather cover portion 202 of the charcoal grill weather cover 200, and to the cover portion 106 of the charcoal grill 102.

In another embodiment, the plurality of support members 204 are post-like structures that comprise a tubular portion 318 with through-hole extending there through. A screw 320 affixes one end of the tubular portion 318 to the cover portion 106 of the charcoal grill 102. In an exemplary embodiment, the screw 320 is a self-tapping screw. The self-tapping screw 320 is configured to enter into the relatively soft metal material of the weather cover portion 202 of the charcoal grill weather cover 200. In another embodiment, a relatively long bolt may be used. An optional keeper 322 may be employed to hold the screw 320 in place when the user is affixing the support members 204 to the weather cover portion 202 of the charcoal grill weather cover 200.

The above-described embodiments are particularly suitable for an aftermarket product that may be affixed to a previously purchased charcoal grill 102. The user need only drill holes in suitable locations on the cover portion 106 of the charcoal grill 102. Or, the weather cover portion 202 may be secured to the cover portion 106 of the charcoal grill 102 using a powered driver to drive the self-tapping screws 320.

Alternatively, or additionally, the charcoal grill weather cover 200 may be preconfigured to be affixed to the cover portion 106 of the charcoal grill 102 by the original equipment manufacturer (OEM). The OEM could include the preconfigured charcoal grill weather cover 200 as part of the originally purchased charcoal grill 102, or may provide the charcoal grill weather cover 200 as a separately purchased feature.

In alternative embodiments, the support members 204 may employ a different construction and/or shape, and/or may fasten the charcoal grill weather cover 200 to the cover portion 106 of the charcoal grill 102 using other means. For example, but not limited to, folding tabs, bolts, pins, rivets, snaps, latches, and/or adhesives may be used to affix the support members 204 to the weather cover portion 202 and or the cover portion 106 of the charcoal grill 102. In some embodiments, the support members 204 are a fabricated part of the charcoal grill weather cover 200, such as a fabricated protrusion or the like. Further, any suitable shape may be used for the structure of the support members 204.

In some embodiments, the weather cover portion 202 is affixed to the cover portion 106 of the charcoal grill 102 using alternative structures. An exemplary alternative structure includes, but is not limited to, a block, a protrusion, a wire, or the like.

Figure 4:
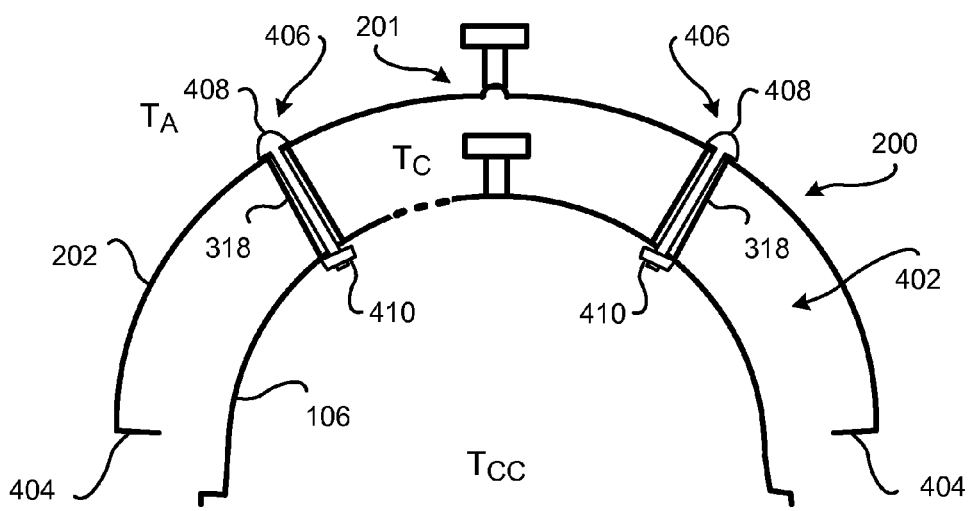
FIG. 4 is a cross section diagram of an alternative embodiment of a charcoal grill weather cover.

FIG. 4 is a cross section diagram of an alternative embodiment of a charcoal grill weather cover 200. In some embodiments, it may be desirable to retard the natural convective airflow in the region of space 402 between the charcoal grill weather cover 200 and the cover portion 106 of the charcoal grill 102. Reducing the natural convective flow of the air in the region of space 402 helps to maintain the cover temperature ($T_C$). That is, the reduced convective flow of air about the region of space 402 results in the exhaustion of the warmer air at the cover temperature ($T_C$) and reduces the inflow of cooler ambient air into the region of space 402.

In the exemplary embodiment of the charcoal grill weather cover 200 illustrated in FIG. 4, the lower edges of the weather cover portion 202, or portions thereof, include a lip 404. The lip 404 may be any suitable inwardly protruding structure at the lower edges and/or end edges of the weather cover portion 202. The lip 404 retards the exhaustion of the warmer air, at the cover temperature ($T_C$) at the lower extent of the charcoal grill weather cover 200, and reduces the inflow of cooler ambient air in from the lower extent and into the region of space 402.

In such embodiments, the design of the lip 404 is coordinated with the design of the exhaust portion 201 so that the exhaust of combustion gasses out from the charcoal grill weather cover 200 is facilitated, while at the same time, the air flow about the lower extent of the charcoal grill weather cover 200 is retarded. Here, an exemplary exhaust portion 201 is illustrated as a channel or the like fabricated at the upper extent of the charcoal grill weather cover 200.

The lip 404 may encompass the entire lower edges and/or end edges of the weather cover portion 202, or may be used at selected locations on the lower edges and/or end edges of the weather cover portion 202. The lip 404 may be a fold or bend in the material of the weather cover portion 202. Alternatively, the lip 404 may be a separate structure that is affixed to the lower edges and/or end edges of the weather cover portion 202 using any suitable means. For example, but not limited to, a separately attachable lip 404 may be affixed to the weather cover portion 202 using screws, bolts, pins, rivets, snaps, latches, wires, and/or adhesives.

In an alternative embodiment, the support member 204 may include a bolt and nut assembly 406. The bolt 408 extends through the through-hole of the support member 204 such that the nut 410, once secured to the threaded end of the bolt 408, affixes the end of the support member 204 to the cover portion 106 of the charcoal grill 102. Alternatively, the bolt 408 may extend through the through-hole of the support member 204 such that the nut 410, once secured to the threaded end of the bolt 408, affixes the end of the support member 204 to the weather cover portion 202.

Figure 5:
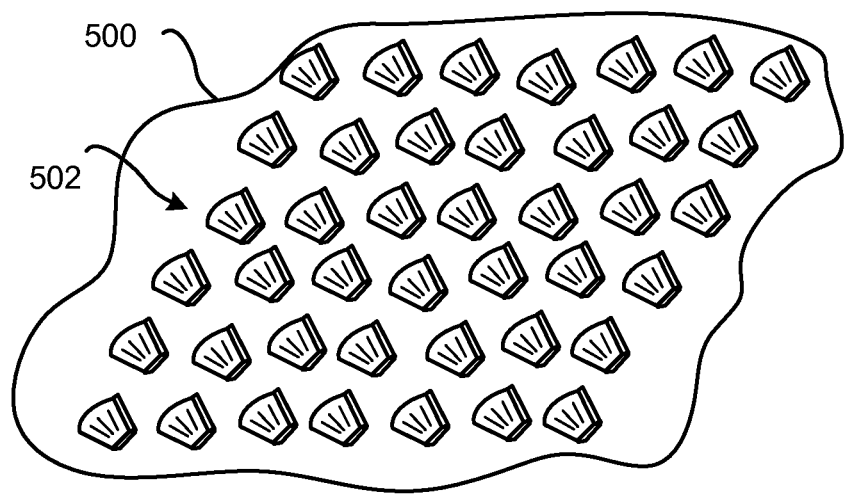
FIGS. 5 and 6 are perspective diagram of portions of the charcoal grill weather cover.

FIG. 5 is a perspective diagram of an underside portion 500 of the charcoal grill weather cover 200. A plurality of protrusions 502 are affixed to the underside portion 500.

It is appreciated that there is an inherent natural convective airflow in the region between the weather cover portion 202 and the cover portion 106 of the charcoal grill 102 as air near the surface of the cover portion 106 of the charcoal grill 102 is heated. The heated air tends to rise upwardly and towards the underside of the weather cover portion 202. The rising air continues to flow generally upward and then out around the edges of the weather cover portion 202 so as to exit into the ambient environment.

The plurality of protrusions 502 are configured to retard the flow of air between the weather cover portion 202 and the cover portion 106 of the charcoal grill 102 caused by the natural convective airflow. Any suitable number, size, shape and/or dimension of the plurality of protrusions 502 may be used. Different sizes, shapes and/or dimensions for the plurality of protrusions 502 may be used. In an exemplary embodiment, the plurality of protrusions 502 may be elongated "ribs" that extend across the underside of the weather cover portion 202.

In such embodiments, the locations of the plurality of protrusions 502 are coordinated with the design of the exhaust portion 201 so that the exhaust of combustion gasses out from the charcoal grill weather cover 200 is facilitated, while at the same time, the air flow about other regions of the charcoal grill weather cover 200 is retarded.

The plurality of protrusions 502 may be individually secured to the underside of the weather cover portion 202 using a suitable fastening means, such as, but not limited to, folding tabs, bolts, pins, rivets, snaps, latches, and/or adhesives. Or, the plurality of protrusions 502 may be fabricated as part of the weather cover portion 202. Alternatively, or additionally, the plurality of protrusions 502 may be secured to the cover portion 106 of the charcoal grill 102.

Figure 6:
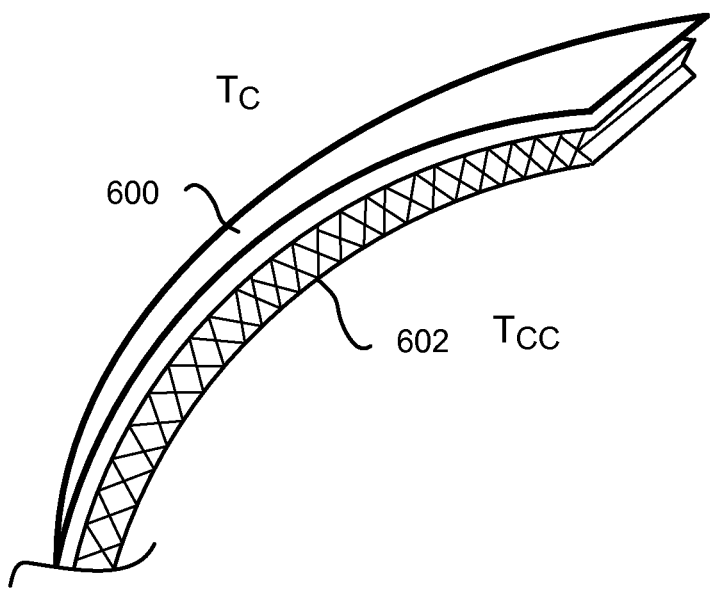

FIG. 6 is a perspective diagram of a portion 600 of the charcoal grill weather cover. In this exemplary embodiment, an insulating material 602 is affixed to one or more selected regions of the underside of the portion 600 of the weather cover portion 202 using a suitable fastening means, such as, but not limited to, folding tabs, bolts, pins, rivets, snaps, latches, and/or adhesives. In an exemplary embodiment, a heat resistant honey-combed insulator is used. The insulating material 602 facilitates maintaining the temperature ($T_C$). A warmer cover temperature ($T_C$) reduces the rate of the decrease in the temperature of cooking chamber ($T_{CC}$). In some embodiments, the air space between the weather cover portion 202 and the cover portion 106 of the charcoal grill 102 may be reduced or even eliminated.

Figure 7:
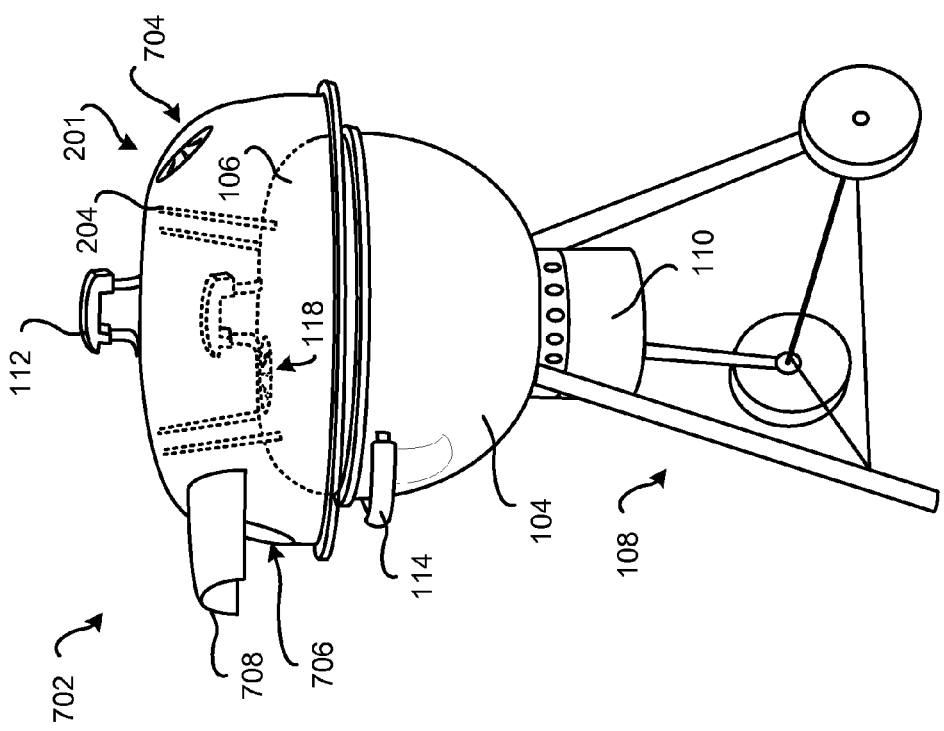

FIG. 7 is a diagram of an alternative embodiment of a weather cover portion 702. In this exemplary embodiment, the weather cover portion 702 is generally domed-shaped so as to generally conform to the shape of the cover portion 106 of the kettle-type charcoal grill 102. Embodiments of the weather cover portion 702 may be configured for, and affixed to, other shaped types of charcoal grills. The exhaust portion 201 may include an optional ventilation port 704 disposed on the weather cover portion 702.

An optional access port 706 may be provided so that the user may reach in under the weather cover portion 702 to adjust the ventilation port 118. An optional weather cover portion 708 may be provided to shield the access port 706 from rainfall.

Figure 8:
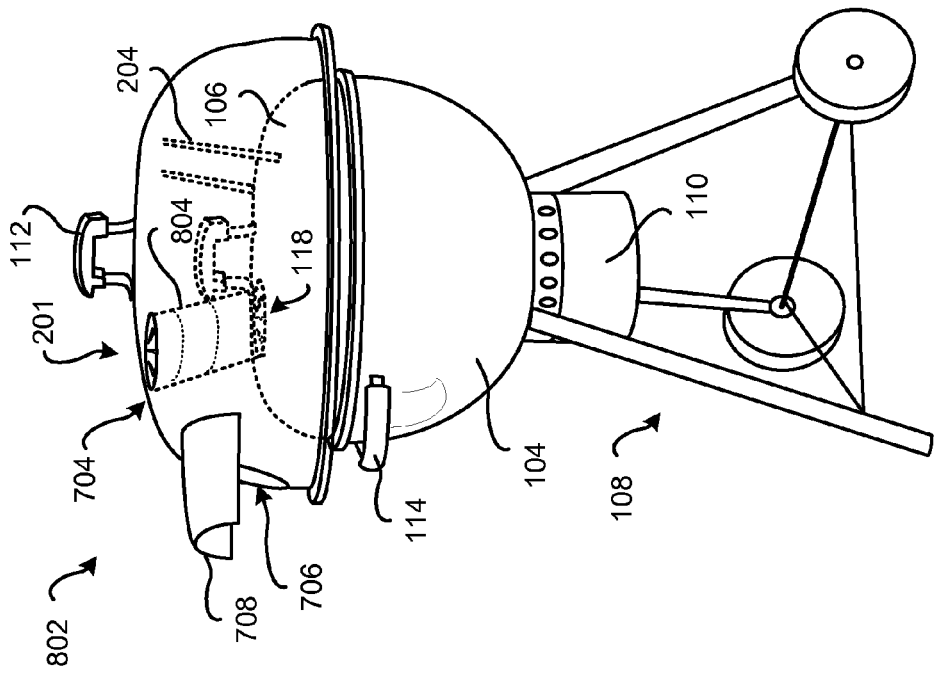
FIGS. 7 and 8 are diagrams of an alternative embodiment of the weather cover portion.

FIG. 8 is a diagram of an alternative embodiment of a weather cover portion 802. In this exemplary embodiment, the weather cover portion 802 is also generally domed-shaped to generally conform to the shape of the cover portion 106 of the kettle-type charcoal grill 102. Embodiments of the weather cover portion 802 may be configured for, and affixed to, other shaped types of charcoal grills.

It is appreciated that higher efficiency of the combustion of the charcoal briquettes is achieved by controlling the flow of air through the combustion chamber of the charcoal grill 102. Accordingly, the exhaust portion 201 includes a vent structure 804 that connects, or substantially connects, the ventilation port 118 of the cover portion 106 of the charcoal grill 102 with the ventilation port 704 on the weather cover portion 802. Exhaust gasses and smoke exiting the combustion chamber are then directly vented to the outside environment. This feature may be more pleasing to the user as the direction of smoke venting out from the charcoal grill 102 may be managed in a controlled manner so as to be directed away from the user.

It should be emphasized that the above-described embodiments of the charcoal grill weather cover 200 are merely possible examples of implementations of the invention. Many variations and modifications may be made to the above-described embodiments, particularly when different features of the various embodiments are interchanged and/or combined. All such modifications and variations are intended to be included herein within the scope of this disclosure and protected by the following claims.

The invention claimed is:

1. A charcoal grill weather cover system, comprising:
a charcoal grill weather cover portion configured to be disposed above a charcoal grill cover portion of a charcoal grill,
wherein the charcoal grill weather cover portion is substantially shaped as a portion of a cylinder that extends lengthwise over a first edge of the charcoal grill cover portion to an opposing second edge of the charcoal grill cover portion,
wherein the charcoal grill weather cover portion is defined by a first lower edge and an opposing second lower edge,
wherein the charcoal grill weather cover portion is further defined by a first end and an opposing second end, wherein the first end and the second end extend in a curve from the first lower edge to the second lower edge; wherein the second end is configured to facilitate access by the user to operate a ventilation port from beneath the weather cover, the ventilation port disposed on a surface of the charcoal grill cover portion;
wherein the charcoal grill weather cover portion is further defined by an exhaust portion, the exhaust portion being an upper extent of the first end of the charcoal grill weather cover portion, wherein the exhaust portion is configured to facilitate an exhaust of combustion gases exiting from a combustion chamber of the charcoal grill such that the combustion gases exiting out from beneath the first end at the exhaust portion of the charcoal grill weather cover portion are directed away from a user of the charcoal grill; and
at least one support member with a first end configured to be secured to the charcoal grill weather cover portion and a second end configured to be secured to the charcoal grill cover portion,
wherein the charcoal grill weather cover portion is configured to substantially prevent rainfall becoming incident on an outer surface of the charcoal grill cover portion.

2. The charcoal grill weather cover system of claim 1, wherein the exhaust portion further comprises:
a vent structure extending from the ventilation port on the charcoal grill weather cover portion to a ventilation port on the charcoal grill cover portion.

3. The charcoal grill weather cover system of claim 1, wherein the support member defines a through-hole, further comprising:
a self-tapping screw configured to extend through a tubular member, and configured to drill into and secure the support member to the charcoal grill weather cover portion.

4. The charcoal grill weather cover system of claim 1, wherein the support member defines a through-hole, further comprising:
a bolt and nut assembly configured to extend through a tubular member, and configured to secure the support member to the charcoal grill weather cover portion.

5. The charcoal grill weather cover system of claim 1, wherein the support member includes a first threaded receiving end and a second threaded receiving end, further comprising:
a first screw configured to extend through the charcoal grill weather cover portion to secure the first threaded receiving end of the support member to the charcoal grill weather cover portion; and
a second screw configured to extend through the charcoal grill cover portion to secure the second threaded receiving end of the support member to the charcoal grill cover portion.

6. The charcoal grill weather cover system of claim 1, wherein the charcoal grill weather cover portion extends lengthwise beyond at least one of the first edge and the opposing second edge of the charcoal grill cover portion.

7. The charcoal grill weather cover system of claim 1, further comprising:
a plurality of protrusions on an underside of the charcoal grill weather cover portion located on an interior surface of the charcoal grill weather cover portion, wherein the plurality of protrusions are between the first lower edge and the second lower edge, and wherein the plurality of protrusions extend downwardly and are configured to impede a convective flow of air between the charcoal grill cover portion and the charcoal grill weather cover portion.

8. The charcoal grill weather cover system of claim 1, further comprising:
a lip on the first lower edge of the charcoal grill weather cover portion, wherein the lip is configured to impede a convective flow of air between the charcoal grill cover portion and the charcoal grill weather cover portion.

9. A charcoal grill, comprising:
a charcoal grill base portion configured to hold a plurality of charcoal briquettes during a cooking process;
a charcoal grill cover portion configured to be disposed over the top of the charcoal grill base portion, wherein the charcoal grill base portion and the charcoal grill cover portion define a cooking chamber;
a charcoal grill weather cover portion configured to be disposed above the charcoal grill cover portion,
wherein the charcoal grill weather cover portion is substantially shaped as a portion of a cylinder that extends lengthwise over a first edge of the charcoal grill cover to an opposing second edge of the charcoal grill cover portion, wherein the charcoal grill weather cover portion is defined by a first lower edge lower edge, wherein the charcoal grill weather cover portion is further defined by a first end that extends in a curve from the first lower edge to the second lower edge, wherein the charcoal grill weather cover portion is further defined by an exhaust portion, the exhaust portion being an upper extent of the first end of the charcoal grill weather cover portion, wherein the exhaust portion is configured to facilitate an exhaust of combustion gases exiting from the cooking chamber of the charcoal grill such that the exiting combustion gases are directed from beneath the first end at the exhaust portion away from a user of the charcoal grill, and wherein the charcoal grill weather cover portion is further defined by a second end that opposes the first end and that extends in a curve from the first lower edge to the second lower edge wherein the second end is configured to facilitate access by the user to adjust a ventilation port disposed on a surface of the charcoal grill cover portion; and at least one support member with a first end configured to be secured to the charcoal grill weather cover portion and a second end configured to be secured to the charcoal grill cover portion, wherein the charcoal grill weather cover portion is configured to substantially prevent rainfall becoming incident on an outer surface of the charcoal grill cover portion.

10. The charcoal grill of claim 9, wherein the charcoal grill weather cover portion extends lengthwise beyond at least one of the first edge and the second edge of the charcoal grill cover portion.

11. A charcoal grill weather cover system, comprising:

a charcoal grill weather cover for preventing precipitation from becoming incident on an outer surface of a cover portion of a charcoal grill, wherein the charcoal grill weather cover is substantially shaped as a portion of a cylinder that extends lengthwise over a first edge of the charcoal grill to an opposing second edge of the charcoal grill, wherein the charcoal grill weather cover is defined by a first lower edge and an opposing second lower edge, wherein the charcoal grill weather cover is further defined by a first end that extends in a curve from the first lower edge to the second lower edge, and wherein the charcoal grill weather cover is further defined by a second end that opposes the first end and that extends in a curve from the first lower edge to the second lower edge wherein the second end is configured to facilitate access by a user to adjust a ventilation port disposed on the outer surface of the cover portion of the charcoal grill, the access to the ventilation port being between the charcoal grill weather cover and the outer surface of the cover portion of the charcoal grill;

a combustion gas exhaustion portion for exhausting combustion gasses out from the charcoal grill weather cover, the combustion gas exhaustion portion is located at an upper extent of the first end of the charcoal grill weather cover, wherein the combustion gas exhaustion portion directs the combustion gases exiting from an exhaust of the cover portion of the charcoal grill out from beneath the first end of the charcoal grill weather cover and away from the user of the charcoal grill; and at least one support member means for securing the charcoal grill weather cover to the charcoal grill cover portion.

12. The charcoal grill weather cover system of claim 1, wherein the support member has a length that positions the charcoal grill weather cover portion above the charcoal grill cover portion to facilitate access by the user to a ventilation port disposed on a surface of the charcoal grill cover portion.

13. The charcoal grill weather cover system of claim 11, wherein the charcoal grill weather cover extends lengthwise beyond at least one of the first edge and the second edge of the charcoal grill.

* * * * *